Jan. 21, 1964 J. PINCHON 3,118,270
SPINNING MACHINE FOR THE PRODUCTION OF COCOONS, COPS AND PIRNS
Filed Dec. 12, 1961 12 Sheets-Sheet 1

INVENTOR:
J. Pinchon
BY
Richards & Geier
ATTORNEYS

INVENTOR:
J. Pinchon

Jan. 21, 1964  J. PINCHON  3,118,270
SPINNING MACHINE FOR THE PRODUCTION OF COCOONS, COPS AND PIRNS
Filed Dec. 12, 1961  12 Sheets-Sheet 5
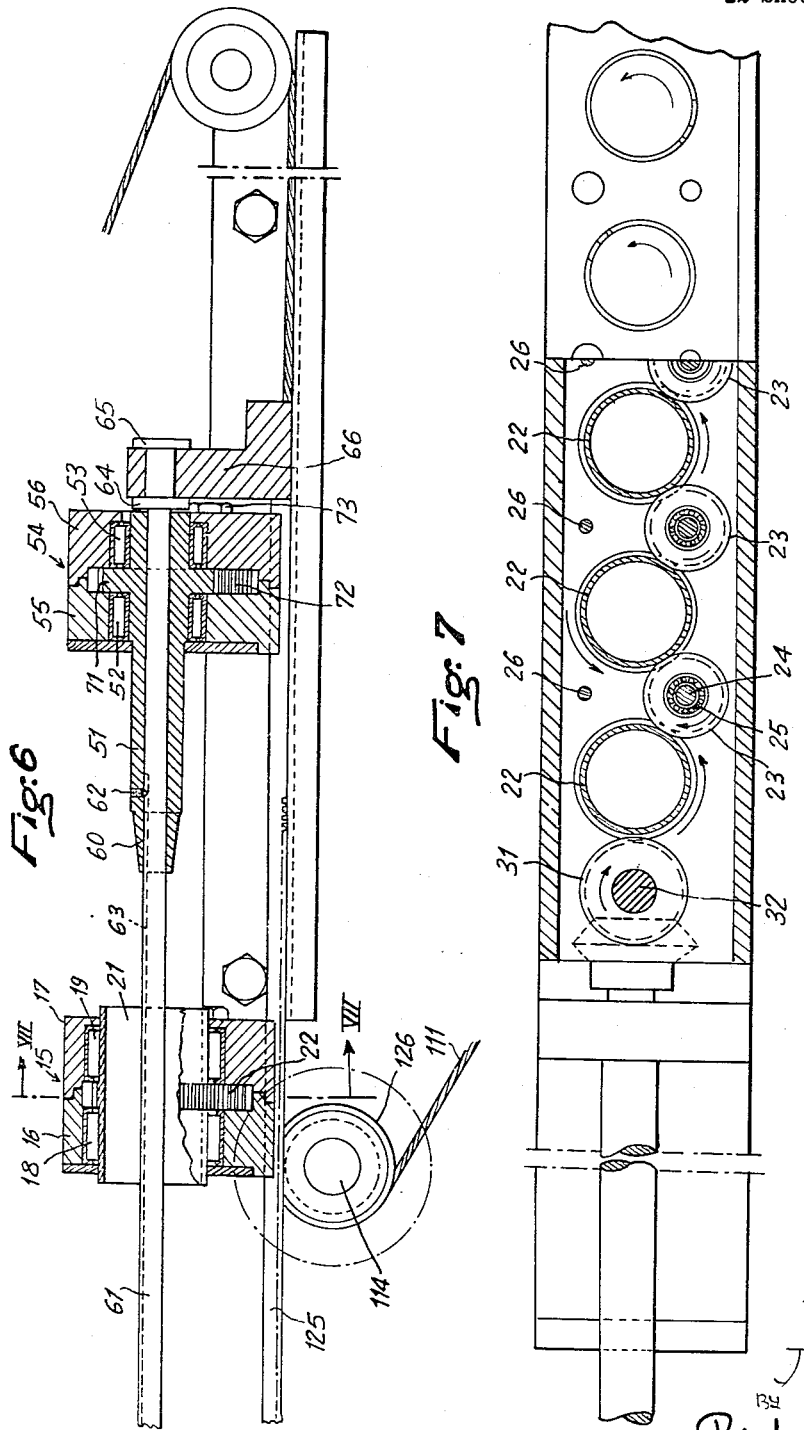
INVENTOR:
J. Pinchon
BY
Richards & Geier
ATTORNEYS

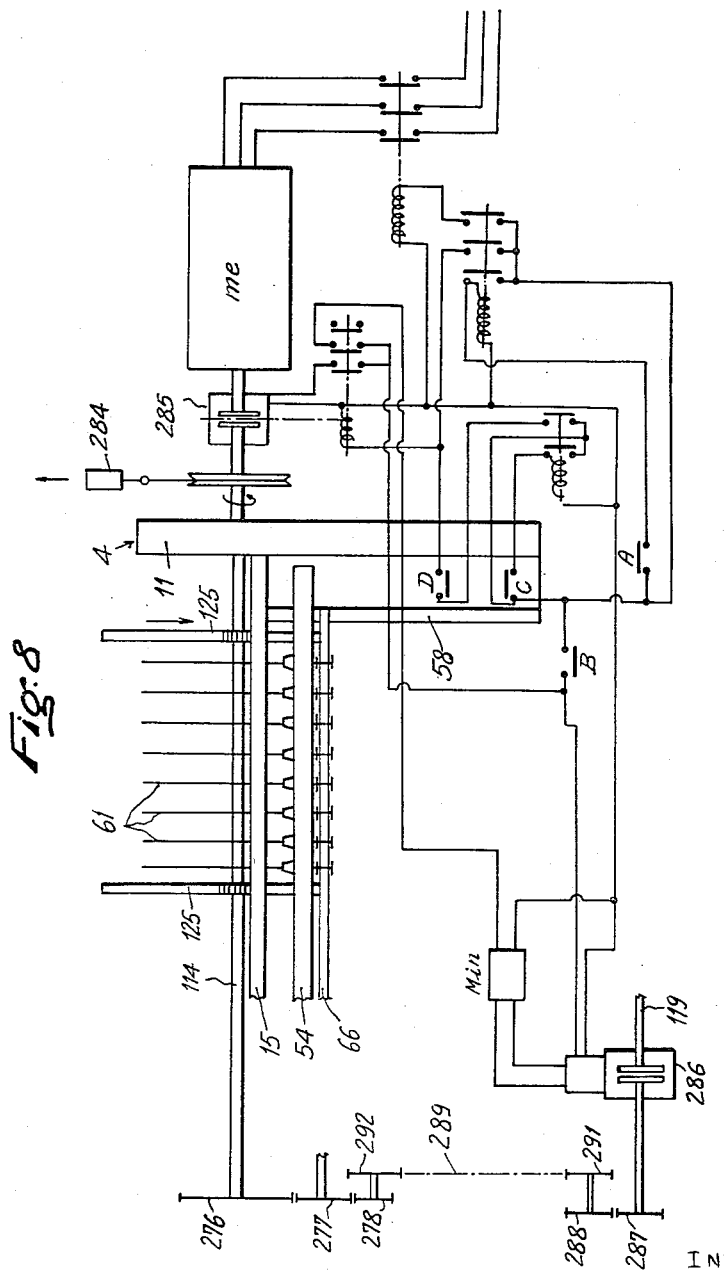

Jan. 21, 1964  J. PINCHON  3,118,270
SPINNING MACHINE FOR THE PRODUCTION OF COCOONS, COPS AND PIRNS
Filed Dec. 12, 1961  12 Sheets-Sheet 7

INVENTOR:
J. Pinchon
BY
Richards & Geier
ATTORNEYS

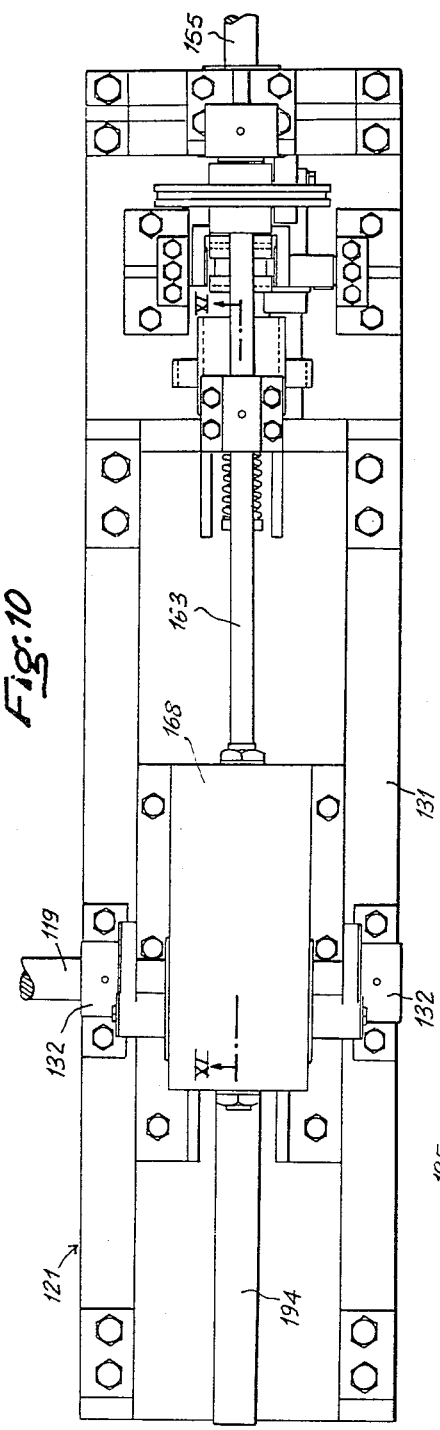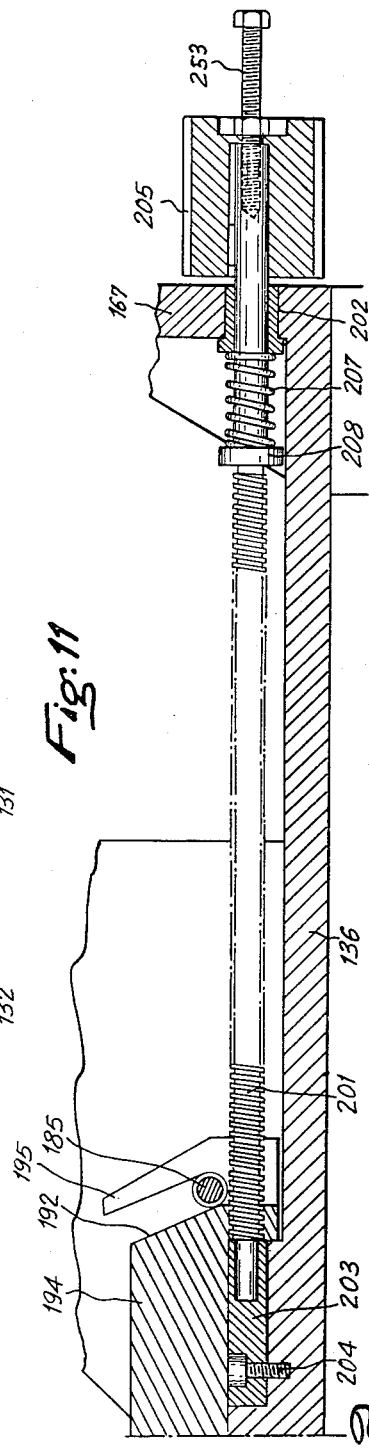

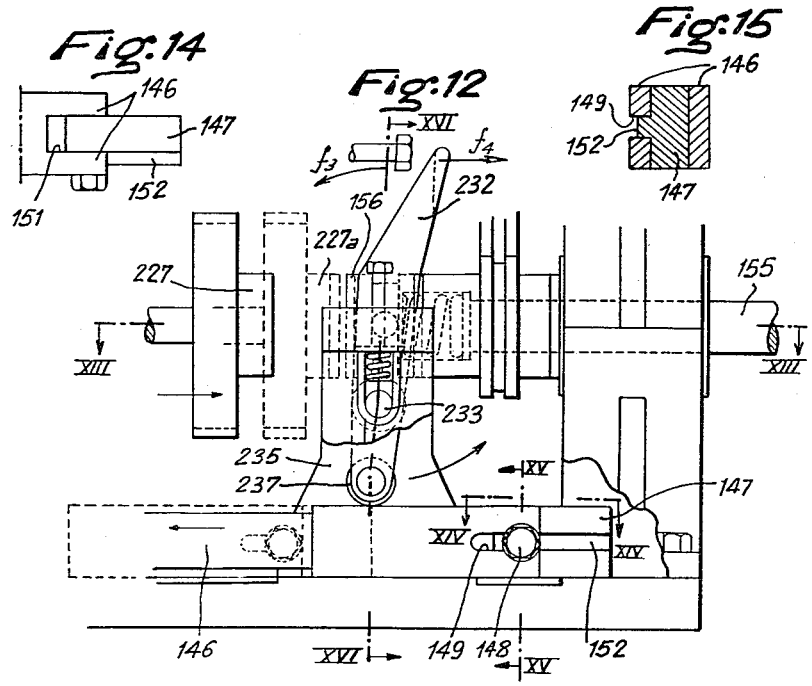
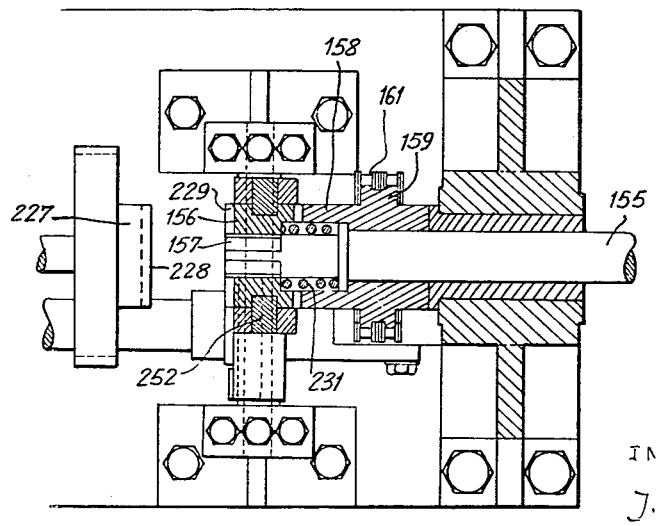

INVENTOR:
J. Pinchon
BY
Richards & Geier
ATTORNEYS

Jan. 21, 1964   J. PINCHON   3,118,270
SPINNING MACHINE FOR THE PRODUCTION OF COCOONS, COPS AND PIRNS
Filed Dec. 12, 1961   12 Sheets-Sheet 11

INVENTOR:
J. Pinchon
By
Richards & Geier
ATTORNEYS

Jan. 21, 1964 J. PINCHON 3,118,270
SPINNING MACHINE FOR THE PRODUCTION OF COCOONS, COPS AND PIRNS
Filed Dec. 12, 1961 12 Sheets-Sheet 12
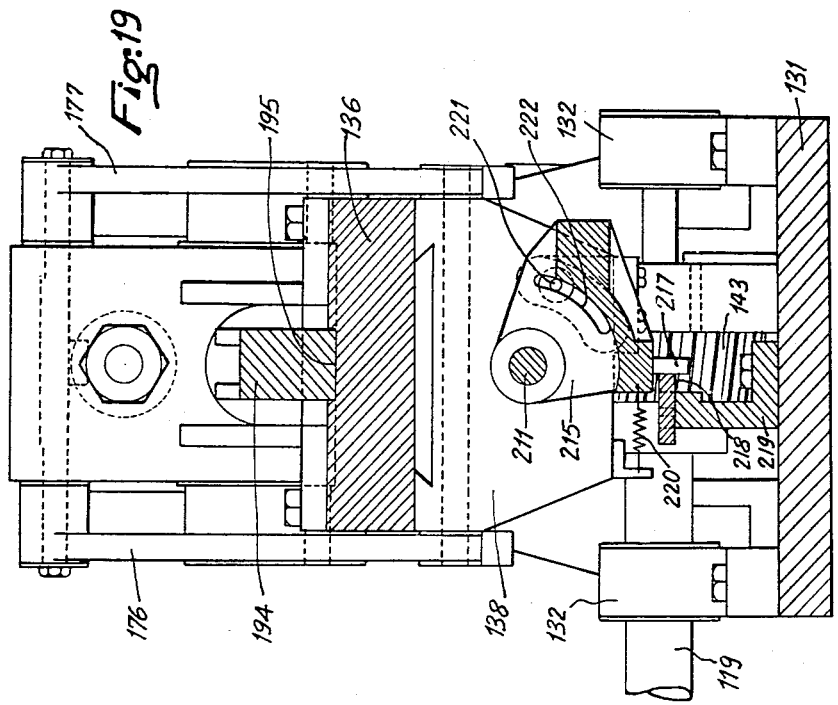
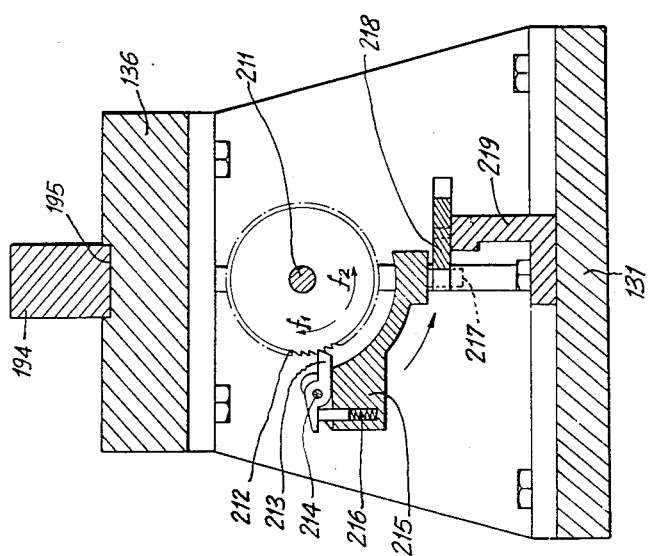
INVENTOR:
J. Pinchon
BY
Richards & Geier
ATTORNEYS United States Patent Office 3,118,270
Patented Jan. 21, 1964

3,118,270
SPINNING MACHINE FOR THE PRODUCTION OF COCOONS, COPS AND PIRNS
Jean Pinchon, 131 Blvd. de Mulhouse, Roubaix, Nord, France, assignor of one-third to Pierre Dillies, Croix, Nord, France, and one-third to Gerard Lemaire, Roubaix, Nord, France
Filed Dec. 12, 1961, Ser. No. 158,773
Claims priority, application France Dec. 15, 1960
17 Claims. (Cl. 57—50)

To obtain cocoons, cops or pirns usable, for example, in weaving looms, use was hitherto made of installations comprising a carding machine followed by a divider and a rubber, a drawing frame, a mule for putting the yarn into the form of a solid of revolution (pirn), which can then be handled, and finally another mule on which a plurality of the pirns produced by the preceding winding operation are grouped in the form of cocoons or cops.

This method has a certain number of disadvantages, more particularly; defects in the uniformity of the product and losses of material owing to the numerous handling operations necessary at the different stages of production; a large labour force and considerable investment in respect to equipment and premises to house the equipment.

If it is desired to perform the above-mentioned operations successively by disposing machines in series one after the other, the result would be unsuccessful because the outputs of the machines are not the same and continuous operation is rendered difficult owing to numerous yarn breakages. Moreover, the conventional spinning system does not lend itself to this.

In present-day installations, moreover, it is not possible to increase the speed of cards, since the rubber would then no longer have any time to perform its work satisfactorily.

The object of the invention is to provide a high-output machine which is intended to be disposed after a card with a divider and rubber and in which the operations of twisting, drawing, spinning and winding are effected continuously and automatically without the intervention of any labour, without handling at the different stages of production, and without any loss of material. Furthermore, the machine is of very reduced size and enables the rubber disposed after the card to be reduced in size, so that production can be increased as a result of a possible increase in the carding speed. Finally, the machine imparts a considerable false twist to the yarn, this false twist increasing its strength without obstructing the subsequent weaving operations, during which this false twist disappears.

The spinning machine for the production of windings, such as cocoons, cops or pirns according to the invention comprises a plurality of units each of which comprises a rotary and preferably horizontal spindle and a coaxial ring, at a speed of rotation proportional to that of the card, and is intended to receive a roving coming from the rubber, in order to produce a corresponding winding.

According to a further feature of the invention, each ring contains a lateral eye serving as a yarn guide and is rotated positively at a speed slightly different from that of the spindle, while advance means ensure a periodic axial displacement of the spindle with respect to the ring, the amplitude of this displacement being in turn axially offset, at each step, as the cocoon formation progresses.

In one embodiment, the means for rotating each ring are so designed and arranged as to rotate the said ring at a speed such that the difference between the speed of the ring and that of the spindle be inversely proportional to the diameter of the winding at the region where the yarn is being wound at any moment.

The invention also relates to installations comprising a card with a divider and rubber feeding a cocoon producing machine as defined hereinbefore.

Other features of the invention will be apparent from the following description and the accompanying drawings which illustrate by way of example without any limiting force one embodiment of a spinning machine for the production of cocoons according to the invention.

In the drawings:

FIG. 6 is a section substantially on the line VI—VI in FIG. 2, to a larger scale.

FIG. 7 is a section on the line VII—VII in FIG. 6.

FIG. 8 is a diagram showing the complete installation for the control of the spindle bush holders and of the spindle extraction bars.

FIG. 10 is a plan view corresponding to FIG. 9.

FIG. 11 is a larger-scale view of a partial section on the line XI—XI in FIG. 10.

FIG. 12 shows a detail of FIG. 9 to a larger scale.

FIG. 13 is a horizontal section on the line XIII—XIII in FIG. 12.

FIGS. 14 and 15 are partial sections respectively on the lines XIV—XIV and XV—XV in FIG. 12.

FIGS. 17, 18 and 19 are vertical cross-sections respectively on the lines XVII—XVII, XVIII—XVIII, and XIX—XIX in FIG. 9.

Figure 1:
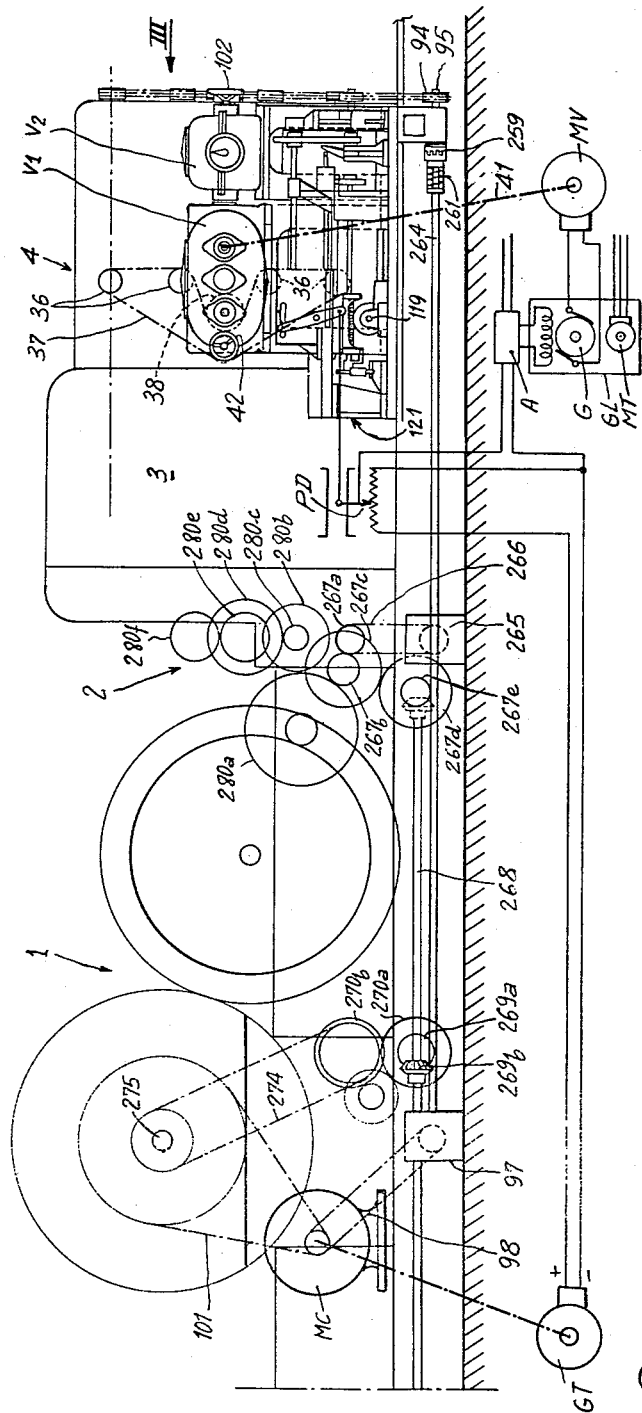
FIG. 1 is a side view of the complete installation comprising a card with a divider and rubber followed by a cocoon producing machine according to the invention.
Figure 2:
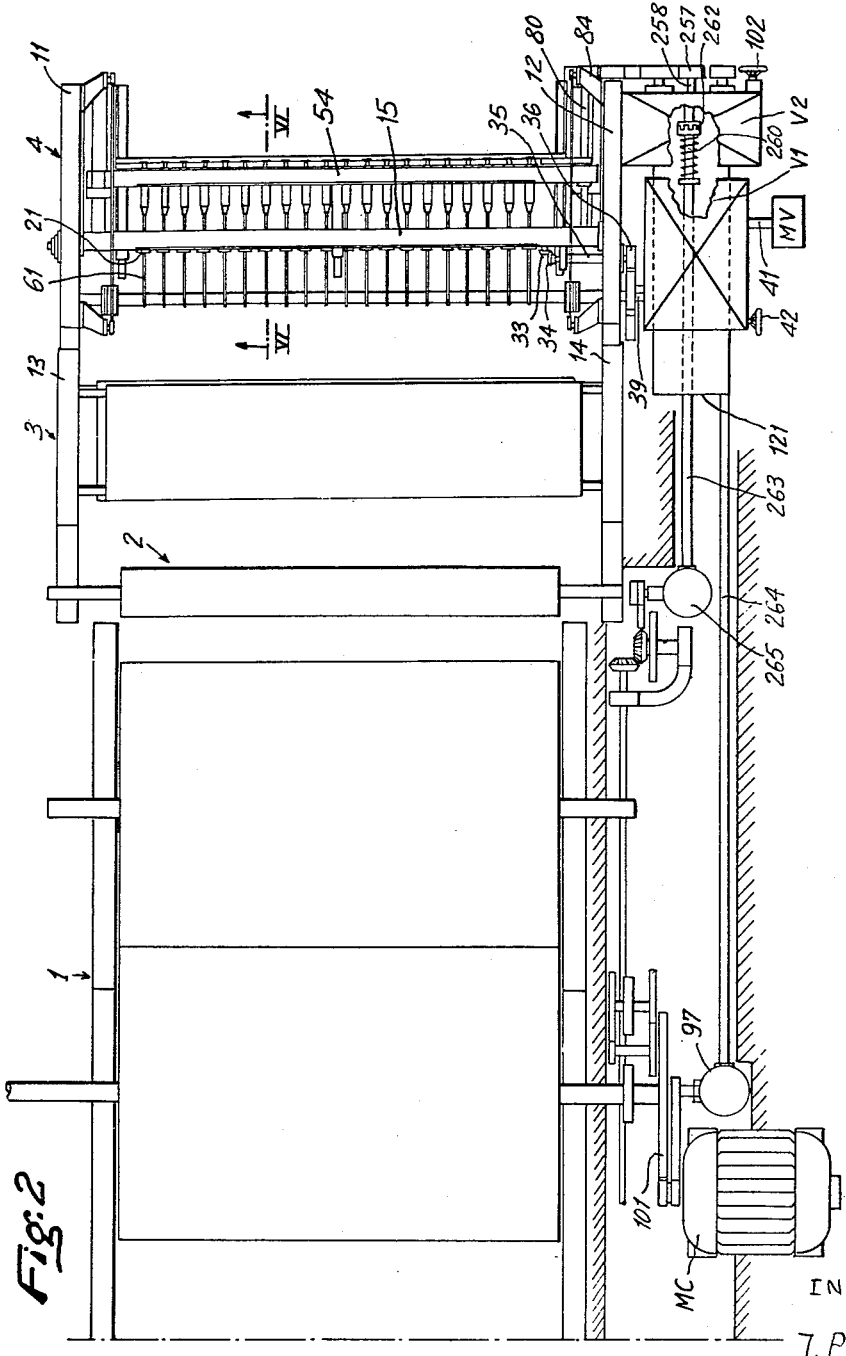
FIG. 2 is a corresponding plan view.
Figure 3:
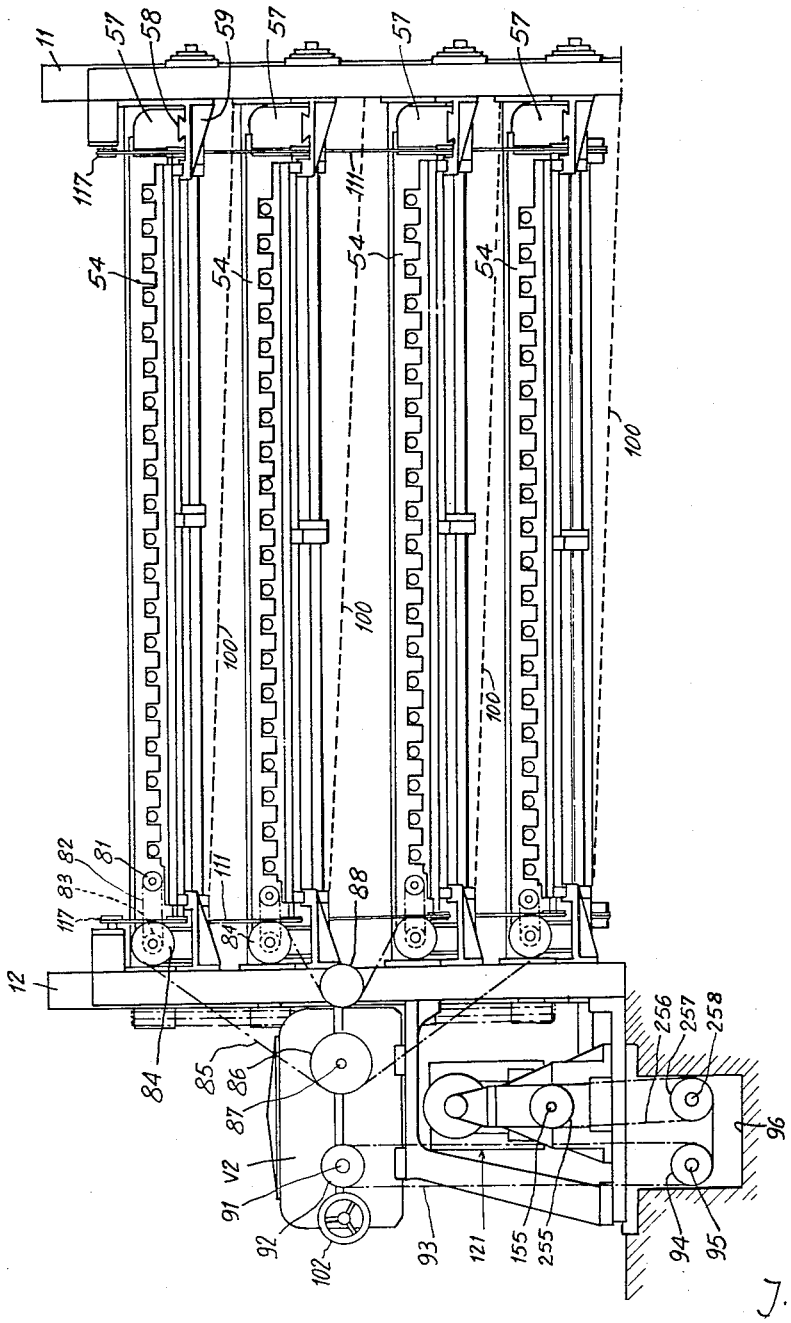
FIG. 3 is a front view in the direction of the arrow III in FIG. 1.

The installation shown in FIGS. 1 to 3 comprises a carding machine 1, a divider 2, a condenser rubber 3, and a machine 4 intended to spin the slivers or rovings emerging from the rubber 3 and to form cocoons with the resulting yarns.

Neither the carding machine 1 nor the divider 2 has any special features, although the condenser rubber 3 may be reduced in size in comparison with conventional rubbers, and the spinning machine for the production of the cocoons 4 is entirely novel.

The spinning machine for the production of cocoons 4 comprises a frame with two cheeks 11 and 12 formed by continuations of the cheeks 13 and 14 of the rubber 3, said cheeks being braced by bars such as 15 (see also FIGS. 4 and 6), of which four are provided, one above the other, in the embodiment illustrated.

The bars 15, which are each formed by an assembly of two bars 16, 17 (FIG. 6), carry a double bearing 18, 19, which in this example is a needle bearing, on the axis of each sliver leaving the rubber 3.

Figure 22:
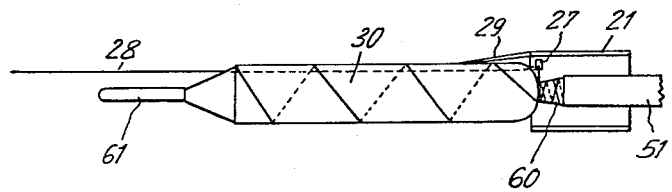
FIG. 22 shows the starting stage of a new cocoon.

The rotary ring 21 (see also FIG. 22) is mounted in each double bearing, such as 18, 19. There are therefore four lines of rings disposed at four levels formed respectively by the four bars 15 which constitute the ring carriers. Each rotary ring 21 has a hole 27 for the passage of the sliver 28 to be spun, and is provided with a yarn cutter formed by an axial cutting blade 29, the free end of which is level with the cylindrical surface of the completed cocoon.

Moreover, each ring carries a gearwheel 22 (FIGS. 6 and 7) substantially in the middle of its length. Two gearwheels 22 associated with two adjacent rings simultaneously mesh with an intermediate gearwheel 23 mounted loosely on an axle 24, preferably by means of a ball or needle bearing 25, the axles 24 being formed by screws which at the same time serve as connecting elements for the two bars 16, 17. Other screws 26 serve to complete the assembly of the two bars.

Rotation of the rings is effected by means of a gearwheel 31 meshing with the first gearwheel 22 of the first ring of the corresponding level. The gearwheel 31 is connected to a shaft 32 which rotates in the ring carrier and which carries a bevel gear 33 (see also (FIG. 2) meshing with another bevel gear 34 connected to one of the ends of a shaft 35 rotating in the cheek 12 and carrying a chain wheel 36.

The chain 37 (FIG. 1) or a belt, such as a V-belt, which takes its movement from a wheel or pulley 38 of an output shaft 39 (FIGS. 1 and 2) of a change-speed device V1 fixed on the frame of the machine and provided with a manual control wheel 42, passes over the wheels, such as 36 of the driveshaft of the rings of each of the four levels.

Thus the change-speed device V1 simultaneously drives all the rings of the machine at the same angular speed.

The input shaft of the speed varying device V1 is shown at 41 and is driven by a motor MV at variable speed, which is fed by the generator G of a Ward-Leonard set GL, the three-phase driving motor of which is denoted by MT. The inductors of the generator G are fed from a tachometric generator GT (FIG. 1) driven by the card driving motor MC through the medium of an amplifier A controlled by a potentiometer PD which will be referred to hereinafter.

A rotary bush, such as 51, is disposed opposite each rotary ring 21 (FIG. 6) and coaxially therewith. Each bush 51 is also mounted rotatably in a double needle bearing 52, 53 is a spindle carrier 54 which is in turn formed by two bars 55, 56, the ends of which are fixed in carriages such as 57 (FIG. 3) movable over a dovetail guide 58 connected to a baseplate 59 fixed to the corresponding cheek 11 or 12 of the machine.

A spindle 61 (FIG. 6) is mounted slidably in each bush 51 and is connected thereto as regards rotation by means of a screw 62 mounted radially in the said bush, the end of said screw being engaged in a longitudinal slot 63 in the said spindle.

The heel of each spindle 61 carries two collars 64, 65 engaging on either side of a bar 66 referred to as the spindle extraction bar, which can move parallel to itself, also on dovetail guides 58, so as to cause the spindles to slide axially in the bushes. There is therefore a spindle extraction bar per spindle level.

Each spindle bush is rotated by a gearwheel 71 (FIG. 6) connected to the said bush, the gearwheels of two adjacent bushes simultaneously meshing with another intermediate gearwheel 72 mounted loosely on an axle 73 fixed in the spindle holder 54. The axles 73 are again formed by screws which at the same time serve to connect the bars 55 and 56.

The first bush of each spindle holder carries a wheel 81 (FIG. 3) over which passes a chain 82 which also passes over a wheel 83 connected to a shaft 89 carrying a pulley 84. A common belt 85 passes over the four pulleys 84 of the four spindle levels and also passes over a pulley 86 mounted on the output shaft 87 of another change-speed device V2. The belt 85 also passes over a reversing pulley 88 (FIG. 3).

The input shaft 91 of the change-speed device V2 (FIG. 3) is driven from the following elements: a pulley 92 mounted on the said shaft 91, a belt 93 passing over the pulley 92 and over a pulley 94 mounted on a shaft 95, a dog clutch 259 subject to the action of a spring 261, a shaft 264 disposed in a pit 96, a reversing box 97 (see also FIGS. 1 and 2), a belt 98 and the electric motor MC which at the same time serves to drive the carding machine through a belt 101.

Reference 102 (FIGS. 1 to 3) denotes the handwheel for adjustment of the output speed of the change-speed device V2.

The speed of rotation of the spindles is therefore proportional to that of the motor MC, i.e. to the speed of the card, with adjustment possible by means of the change-speed device V2.

The reciprocating movement of the spindle holders 54 is effected by means of a backshaft scroll cable 111 (FIGS. 4–6) which on each level passes over two loose pulleys 112, 113 respectively mounted on axles 114, 115, over two top pulleys 116, 117, and over a driving pulley 118 connected to a transverse output shaft 119 of a winding stock mechanism, which is denoted generally by reference 121 (FIGS. 1 to 3) and which is disposed beneath the two change-speed devices V1 and V2.

A spindle holder drive cable 111 is provided at each of the two ends of the spindle holders. For this purpose, the shaft 119 extends over the entire width of the machine and carries a pulley 118 at each of its ends.

Moreover, each spindle extraction bar 66 (FIG. 6) is displaced in parallel relationship to itself by means of a system of two racks 125 connected respectively to the two ends of the said bar and each engaging with a corresponding gearwheel 126 connected to the corresponding shaft 114. It should be noted that the pulleys 112 over which pass the cables 111 for the backshaft scrolls for the drive of the spindle holders, which are already mounted on said shafts, are loose thereon. The manner in which the shafts 114 are rotated will be described hereinbelow.

The function of the winding stock 121 is to ensure axial displacements of the spindle bush holders.

Figure 17:
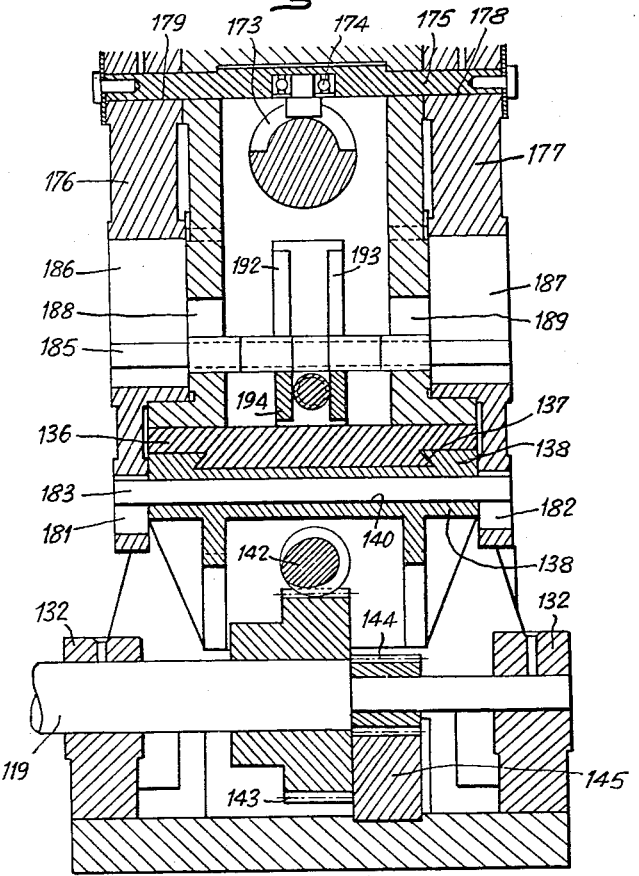

It comprises a frame 131 (FIGS. 9 and 10) with bearings 132 in which the shaft 119 rotates (see also FIG. 17).

Two brackets 134, 135 (FIG. 9) are fixed on the baseplate 131 and support a plate 136, the bottom surface of which forms a dovetail guide 137 (FIG. 17), on which a carriage 138 slides.

The shaft 139 rotates in the carriage 138 and is connected to a worm 142 meshing with a worm gear 143 connected to the winding stock output shaft 119. A gearwheel 144 is also fixed on the shaft 119 and meshes with a rack 145 connected to a rule 146 adapted to slide longitudinally on the top of the baseplate 131. The opposite end of the rule 146 to the rack 145 carries a heel 147 (FIGS. 12, 14 and 15), of which the longitudinal position on the rule 146 can be adjusted. To this end, the heel 147 can slide in a longitudinal mortise 151 of the rule and has a guide tongue 152 engaging in a slot 149 of the rule. A locking screw 148 mounted in the heel 147 and passing through the slot 149 in the rule enables the said heel to be locked in any desired relative position with respect to the rule.

Figure 9:
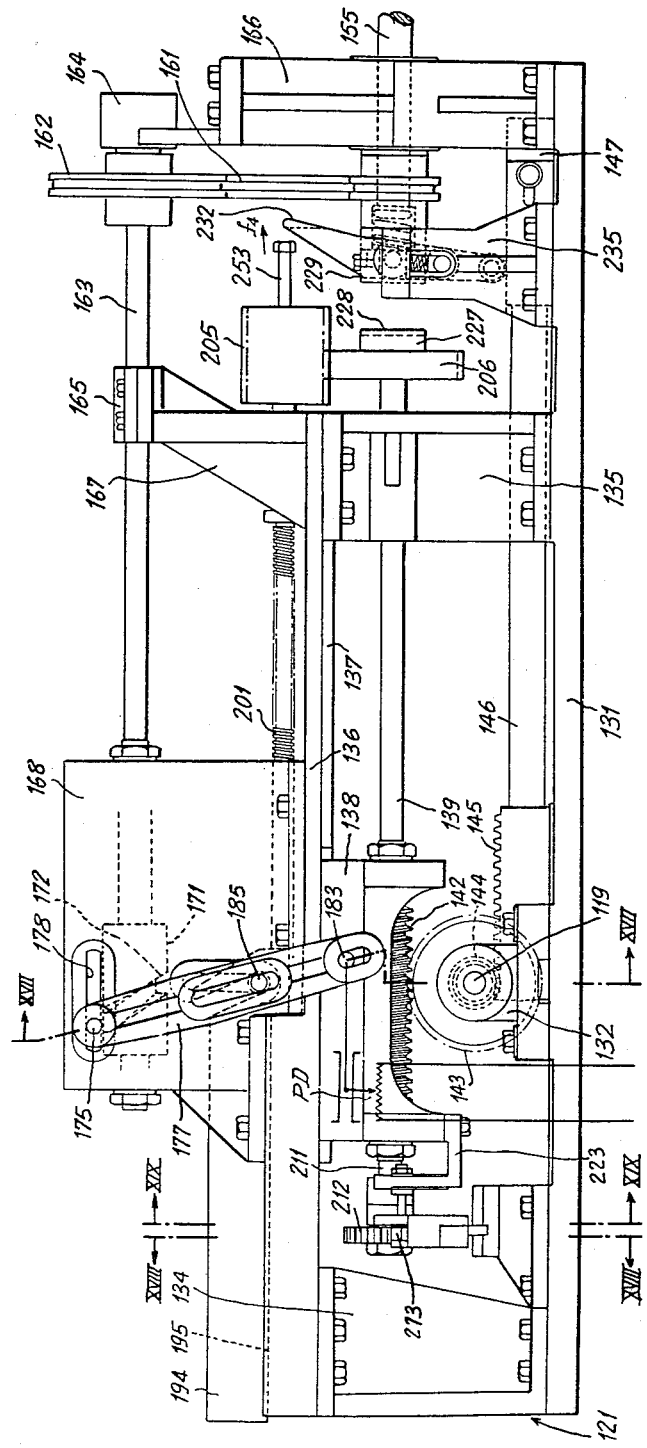
FIG. 9 is a larger-scale view of the winding stock shown in the bottom right-hand part of FIG. 1.

The carriage 138 is reciprocated on its guide by means of a transmission device comprising a shaft 155 (FIGS. 9 and 10) which constitutes the winding stock input shaft, a sleeve 156 (see also FIGS. 12 and 13) slidably mounted on the fluted end 157 of shaft 155. Sleeve 156 is provided with dogs which are adapted to engage matching dogs on the hub 158 of a chain wheel 159. The device further includes a chain 161, another chain wheel 162 mounted on a shaft 163 which shaft is supported at one end in bearings 164, 165 (FIG. 9). The bearings are connected by means of supports 166 and 167 respectively, to the frame 131 of the winding stock. The other end of shaft 163 is supported in a casing 168 which is supported on the top surface of the fixed plate 136. A drum cam 171 is connected to the shaft 163 and has a helical slot 172 in which engages a roller 173 (FIG. 17) mounted in the inner race of a ball bearing 174. The outer race of ball bearing 174 is housed in the transverse bore of an axle 175. The axle 175 is fixed in the top ends of two levers 176 and 177 (see also FIG. 9) respectively, and can slide in two horizontal grooves 178, 179 formed longitudinally in the side walls of the casing 168.

The bottom ends of the two levers 176, 177 have longitudinal apertures 181, 182 respectively, in which are engaged the two ends of a spindle 183 which transversely passes through the carriage 138 in a hole 140 in the latter.

The two levers 176 and 177 pivot on an intermediate axle 185 which passes through two longitudinal apertures 186 and 187 in these two levers respectively. The axle 185 also passes through two vertical apertures 188, 189 formed in the two vertical side walls of the casing 168, and through two oblique slots 192, 193 formed in a forked end of a rule 194 which can slide longitudinally in a groove 195 (FIGS. 9, 10, 11, 17, 18, 19) formed in the top face of the plate 136.

The longitudinal sliding movement of the rule 194 is obtained by means of a screw 201 (FIGS. 9 and 11), one end of which is mounted in a bronze ring 202 mounted in a vertical wall of the support 167 while the other end is mounted in a part 203 fixed on the plate 136 by a screw 204.

The rotary movement of the screw 201 is obtained by means of a long-toothed gearwheel 205 connected to the screw 201 and meshing with a gearwheel 206 connected to the shaft 139 carrying the worm 142, the latter being rotatable by various means which are described hereinbelow.

The screw 201 may also undergo a slight movement of axial translation in its supports and it is urged into the position shown in the drawings by means of a spring 207 (FIG. 11) which bears against one end of the bearing ring 202 and against a collar 208 of the screw 201.

A ratchet wheel 212 is fixed on an extension 211 (FIG. 18) of the worm 142 and with it co-operates a pawl 213 mounted on an axle 214 which is in turn mounted in a support 215 pivoting on the shaft 211. A spring 216 urges the pawl into its position of engagement with the ratchet wheel 212. The case 215 carries a finger 217 (see also FIG. 19) which slides along a cam 218 fixed on the top part of an angle-iron 219 which is in turn fixed on the winding stock baseplate 131.

On each reciprocating movement of the carriage 138 the catch 217 slides along the cam 218 against which it remains applied under the action of the weight of the case 215, and a spring 220 (FIG. 19), and it therefore causes the ratchet wheel 212 to advance by means of the pawl 213, by one or more teeth (in the direction of the arrow f1 (FIG. 18)), while at the same time driving the worm 142 through the same angle.

A finger 221 for arresting the pawl 213 is fixed in a groove 222 in the form of an arc of a circle coaxial with the ratchet wheel 212, said groove being formed in a support 223 (FIG. 9) connected to the carriage 138. This arresting finger is so adjusted that when the case 215 carrying the pawl occupies its lowest position the said finger keeps the pawl raised and free of the teeth of the ratchet 212 so that the latter can then be turned in the direction of the arrow f2 (FIG. 18).

The intermittent low-amplitude angular movement of the ratchet wheel 212 is therefore transmitted on the one hand to the worm 142, thus displacing the location of the travel of the rack 145, and on the other hand to the shaft 139 and the gearwheel 205, thus producing intermittent rotation of the screw 201 and an advance of the rule 194.

The screw 142 may, however, be driven in the other direction continuously at a much more rapid speed by means of the hub 227 of the gearwheel 206, which is provided with dogs 228 which, under certain conditions which will be described hereinbelow, can engage with matching dogs 229 on the hub 156 (FIG. 13), this hub having to be moved to the left (in FIG. 13) so that it is disengaged from the hub 158 of the chain wheel 159.

Figure 16:
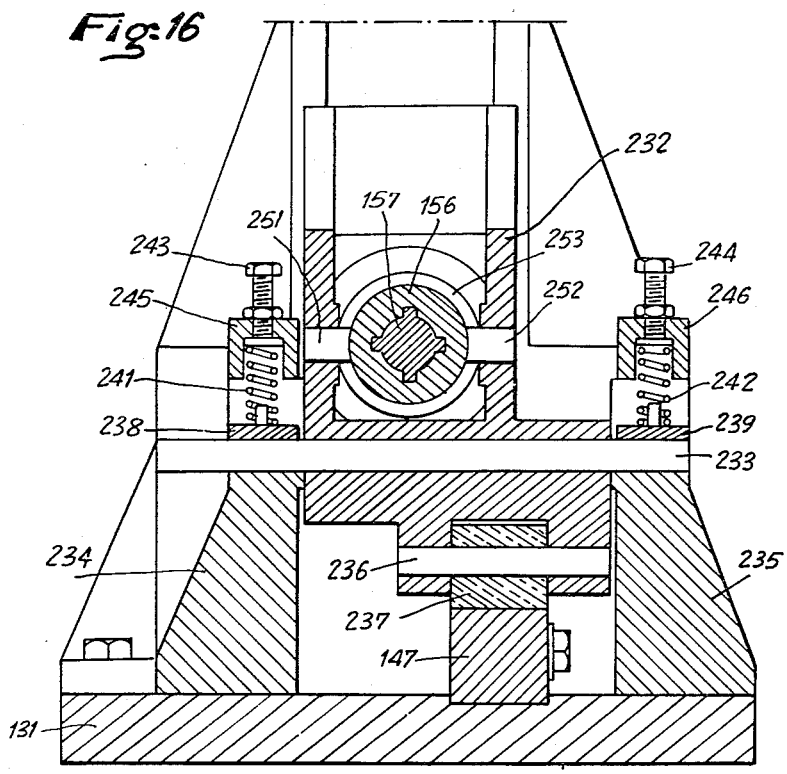
FIG. 16 is a vertical cross-section on the line XVI—XVI in FIG. 12, to a larger scale.

The hub 156 is urged to move to the left under the action of a spring 231 against which it is kept engaged against the hub 158 by means of a releasable locking device controlled by a lever 232 (FIGS. 9, 12 and 16).

The lever 232 is a double lever mounted by means of an axle 233 in two supports 234, 235 connected to the winding stock baseplate 131. The bottom end of the lever 232 carries a spindle 236 provided with a roller 237 rolling on the top surface of the heel 147 of the rule 146.

The two ends of the axle 233 are kept applied resiliently downwards in the two supports 234, 235 by push-members 238—239 urged by springs 241, 242 subject to the action of adjusting screws 243, 244 mounted in caps 245, 246 respectively fixed on said supports.

Two catches 251, 252 (see also FIG. 13) connected to the lever 232 engage in an annular central groove 253 of the sleeve 156 and enable the latter to slide on the fluted shaft 157.

In the position illustrated, the lever 232 is slightly inclined upwards and to the right (FIGS. 9 and 12) so that the roller 237 resting on the heel 147 prevents the said lever from pivoting in the anticlockwise direction f3 under the action of the spring 231. After the heel 147 has escaped to the left beneath the roller 237, for reasons indicated hereinbelow, the lever 232 then pivots in the direction f3. It is returned in the opposite direction by the axial sliding movement of the screw 201, which is terminated by a stop formed by an adjusting screw 253 which is intended to push the top end of the said lever 232 in the direction of the arrow f4 (FIGS. 9 and 12).

Furthermore, the slider of the potentiometer PD, which is assumed to be rectilinear and which is connected to the shaft 183 (FIG. 9) in such manner that when the lever 177 occupies a substantially vertical position the supply voltage for the motor MV (FIG. 1) is at a minimum while when the said lever reaches its maximum inclination (in the direction shown in FIG. 9), the said voltage becomes maximum.

The winding stock input shaft 155 is driven by a transmission comprising the following elements: a pulley 255 (FIG. 3) fixed on the shaft 155, a belt 256 which passes over the pulley 255 and over a pulley 257 (see also FIG. 2) fixed on a shaft 258 also housed in the pit 96, a dog clutch 262 urged by a spring 260, a shaft 263, a reversing box 265, a chain drive 266 (see also FIG. 1), a gear train 267a, 267b, 267c, 267d, 267e, 267f, a shaft 268, a bevel gear 269a, 269b, a gear train 270a, 270b, a chain drive 274 which takes its movement from the shaft 275 of the card 1, which is in turn driven by the chain 101 from the motor MC.

The speed of rotation of the input shaft 155 of the winding stock 121 is therefore proportional to the speed of the motor MC, i.e. the speed of the card, and at the same time to that of the divider 2, the éléments of which are driven by a gear train 280a, 280b, 280c, 280d, 280e, 280f, taking its movement from the gear 267b which forms part of the winding stock drive kinematic chain.

Figure 4:
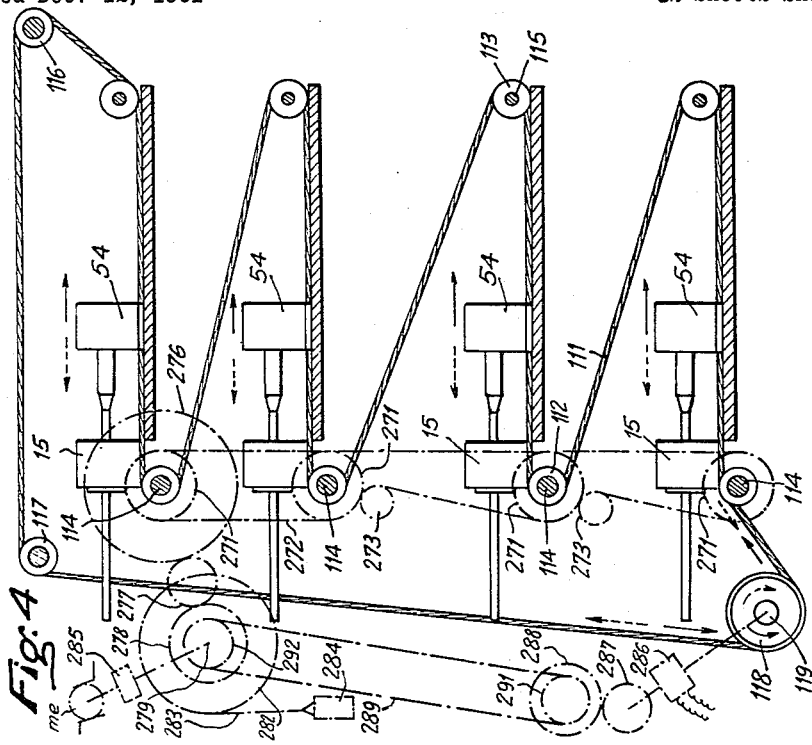
FIG. 4 is a diagrammatic longitudinal section showing the drive for the spindle rails and spindle extraction bars of the cocoon producing machine.
Figure 5:
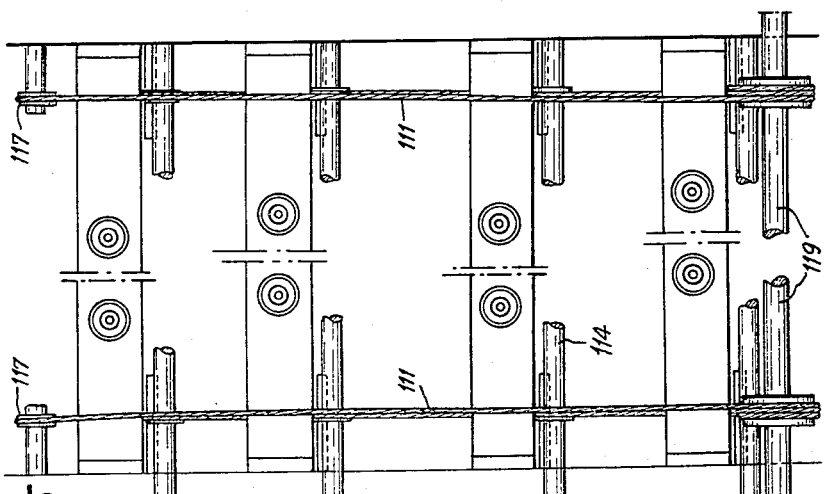
FIG. 5 is a corresponding front view of FIG. 4.

It was stated hereinbefore that the spindle extraction bar 66 at each of the four levels is driven by two racks 125 meshing with gearwheels 126 connected to a transverse shaft 114 (FIG. 6). FIG. 4 shows the four shafts 114 driving the four spindle extraction bars 66 of the four levels.

A sprocket wheel 271 is fixed on each of the four shafts 114 and an endless chain 272 passes over these four sprockets. On the two intermediate shafts 114 the chain is kept in contact with the corresponding sprockets 271 by means of two pressure rollers 273.

Rotation of the four shafts 114 is effected from the top shaft on which is fixed a gearwheel 276 meshing with a gearwheel 277 which in turn meshes with another gearwheel 278 fixed on a shaft 279, this shaft being referred to as the "winch shaft" because it carries a drum 282 on which a cable 283 for the suspension of a counterweight 284 is wound.

The winch shaft 279 may be driven from two different sources of movement, namely: an electric motor with a reduction gear *me* and the output shaft 119 of the winding stock 121.

The transmission connecting the motor *me* to the winch shaft 279 contains a clutch 285, preferably of the electromagnetic type.

The transmission between the winch shaft 279 and the winding stock output shaft 119 comprises the following elements: a clutch 286, also preferably of the electromagnetic type, a gearwheel 287, another gearwheel 288 meshing with the gearwheel 287 and a chain transmission 289 comprising two chain wheels 291 and 292 respectively fixed on the shaft of the gearwheel 288 and on the winch shaft 279.

During operation of the machine, the extraction bars follow the movements of the spindle rails 54 under the action of the transmission driven by the winding stock output shaft under the control of the clutch 286, while when the cocoons are doffed the extraction bars are actuated now by the counterweight 284, now by the motor *me* under the control of the clutch 285, under the conditions described in detail hereinafter.

The dog clutches 259 and 262 enable the drive connections for the spindles and the winding stock to be broken when it is required to remove the spinning machine 4 from the rubber 3, for example for repairs and maintenance, such as cleaning of the carding machine. To this end, the divider and rubber, and the spinning machine, are installed on cast-iron baseplates and can be shifted by any appropriate means, such as jacks and racks (not shown).

The operation of the complete spinning machine for the production of cocoons is as follows:

Assuming, in the first instance, that the machine is in working order and that the permanent state of operation has been established. The slivers leaving the rubber 3 are each spun by a unit consisting of a spindle, such as 61, and a ring, such as 21 (FIGS. 2 and 6). The spindles and rings are rotated by the devices described hereinbefore and at relative speeds which will be discussed in detail hereinafter.

The continuous rotation of the input shaft 155 of the widening stock 121 (FIGS. 1 and 9) induces a reciprocating rotary movement in one direction and in the other direction of the output shaft 119, which actuates the back scrolls for the axial displacement of the bush holders 54, and the transmission of a corresponding axial displacement of the extraction bars 66 through drives already described with reference to FIG. 4.

The reciprocating movement of the bush holders varies in amplitude and location as the cocoon formation progresses. At the beginning of the formation of a cocoon (FIG. 20), the travel "$a$" of the spindles has to be small, and then it increases progressively until the cocoon reaches its maximum diameter $d2$, whereupon the amplitude "$b$" of the displacement remains constant but the location of the travel shifts towards the final pointed end of the cocoon.

If the kinematics of the winding stock (FIG. 9) are studied in detail, it will be seen that the continuous rotation of the input shaft 155 is transmitted through the chain 161 to the top shaft 163 which therefore drives the cam 171 at constant speed. The helical groove 172 in this cam is invariable, so the axle 175 moves horizontally with a reciprocating movement of constant travel both as regards amplitude and location.

At the beginning of the formation of a cocoon, the rule 194 occupies the position shown in FIGS. 9 and 11, so that the axle 185 occupies its lowest position in the bottom end of the oblique groove 192 of the ruler 194. The amplitude of the angular movement of the levers 177, 176 is therefore at a minimum about the axle 185 under the action of the cam 172 so that the axle 183, which is captive in the bottom aperture of these levers, describes its minimum amplitude travel. The carriage 138 therefore describes a minimum amplitude travel and the worm 142 carried by said carriage then acts as a rack by pivoting the gearwheel 143 through an angle corresponding to the axial travel of the said worm 142, thus inducing a corresponding angular movement of the winding stock output shaft 119 and, hence, a travel of corresponding length and location for the spindles on which the cocoons are formed.

On each movement of the winding stock carriage 138, the pawl 213 under the action of the finger 217 sliding on the ramp 218 (FIGS. 18 and 19), causes the ratchet wheel 212 to pivot through a corresponding angle in the direction of the arrow $f1$, so that on each reciprocating movement the worm 142 pivots through a certain angle about its axis. On each reciprocating movement the gearwheel 143 is therefore offset angularly and induces a corresponding offset in the longitudinal location of the spindles. Since the rings occupy a fixed axial position, the successive layers of the formation of the cocoons therefore progress axially.

Figure 20:
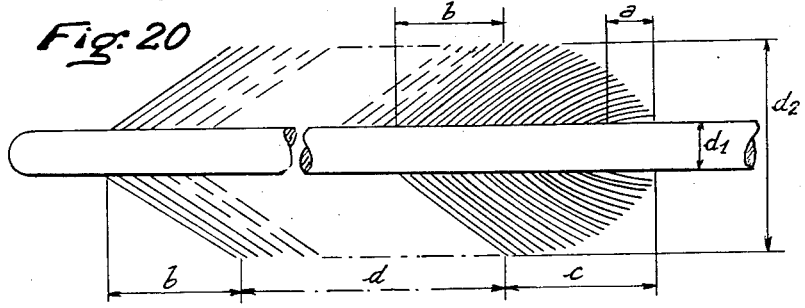
FIG. 20 shows the structure of the successive layers of a cocoon.

According to FIG. 20, however, it will be seen that until the maximum diameter "$d2$" of the cocoon has been achieved the axial length of the turns must increase from the length "$a$" to the length "$b$." This result is obtained because the rotation of the worm 142 under the action of the pawl induces corresponding pivoting of the screw 201 through the gearwheels 206 and 205. The rule 194 meshing with the screw 201 therefore advances gradually to the right (FIGS. 11 and 9) so that under the action of the ramp formed by the inclined wall 192 of the groove of the rule 194 the axle 185 rises in the vertical slots 188, 189 of the fixed casing 168 of the winding stock; the bottom lever arm of the levers 176, 177, i.e. the distance between the axle 185 and the axle 183, increases progressively, while the top lever arm, i.e. the distance between the axles 175 and 185, decreases progressively.

Since the travel of the axle 175 in the horizontal slots of the casing 168 is constant, the horizontal travel of the carriage 138 increases progressively. The axial travel of the spindles therefore increases in the same proportion.

At a certain time, the axle 185 will reach the level of the top surface of the rule 194. As from then on, it will remain at the same level and rest on this surface irrespective of the length by which the rule 194 continues to move to the right under the effect of the rotary movement of the screw 201 driven angularly through a certain angle on each movement of the carriage 138. As from that moment, the length of the reciprocating movement of the spindles is constant but continues to be offset towards the final end of the cocoon by the action of the pawl which still turns the worm 142 through a certain angle on each movement.

Moreover, it will be seen that the speed of rotation of the rings (though smaller than that of the spindles) is all the higher, the more the axle 183 (FIG. 9) has moved to the right from its vertical position, as a result of the control of the speed of the motor MV by the potentiometer PD, i.e. is all the higher as the yarn 28 winds over a smaller diameter of the cocoon. Once the diameter $d2$ (FIG. 20) has been reached, the minimum speed of the rings on each reciprocation cycle of the cocoons no longer varies.

The rule 146, which is disposed on the winding stock baseplate 131 (FIG. 9) is also subject to a geometrically similar reciprocating movement to that of the spindles and the location of its travel moves progressively to the left whenever the carriage 138 effects its travel.

During all this time the roller 237 (FIG. 12) rolled on the top surface of the rule 146 and held the sleeve 156 in engagement with the chain wheel 159 against the force of the spring 231 (see also FIG. 13), so that the winding stock input shaft 155 continued to be connected to the drive of the cam 171 by the drive chain 161 of the top shaft 163.

There will be a time, however, when the right-hand end of the heel 147 connected to the rule 146 escapes to the left beneath the roller 237. At that time, since the rule 146 occupied its extreme left-hand position possible, the carriage 136 occupied its extreme right position, and the same applies to the coupling sleeve 227 as shown in broken lines in FIG. 12, at 227a. In consequence, when the roller no longer rests on the rule 146 the spring 221 abruptly pivots the lever 232 in the anticlockwise direction, i.e. in the direction of the arrow f3 (FIG. 12), and the coupling sleeve 156 abruptly released from the chain wheel 158 is now in engagement with the sleeve 227 by means of the dogs 229 and 228.

The shaft 155, which continues to turn, therefore no longer drives the top shaft 163 for the reciprocating drive but now drives the sleeve 227, the gearwheel 206, the shaft 139 and the worm 142.

This movement is not prevented by the pawl 213 because at this time the latter is retained by the finger 221 (FIG. 19) in a position away from the teeth of the ratchet wheel 212, which now turns in the direction of the arrow f2.

The carriage 138 is locked by the reciprocating drive, so that the rotation of the worm 142 induces a corresponding rotation of the output shaft 119 of the winding stock. This rotation has a number of results:

(a) It returns the rack 145 and the rule 146 into the initial position, thus bringing the heel 147 beneath the roller 237 of the lever 232, the axle 233 of which lifts slightly in its supports against the springs 241, 242.

(b) The rotation of the gear wheel 206 meshing with the long gear wheel 205 produces a rotation of the screw 201 in the opposite direction of its previous intermittent rotation, so that the rule 194 is brought to its initial position and the axle 185 bears against the nose 195 (FIG. 11) of the rule 194, the latter no longer being able to continue its reverse movement because of the relative position of the slots 188—189 (FIG. 17) and 186—187 of the levers 176—177 (FIG. 17). Towards the end of this movement, the screw 201 bearing against the rule 194 compresses the spring 207 while the stop screw 253 connected to the screw 201 pushes back the top end of the lever 232 (FIG. 12), which resumes its initial position while consequently disengaging the direct drive of the worm and re-engaging the reciprocating movement drive of the carriage 138; the slots 186—187 of the levers 176—177 (FIG. 17) register with the slot 192 of the rule 194, and the axle 185 descends again along the vertical slots 188—189 (FIG. 17) towards the bottom of the slot 192 of the rule 194 which is urged to resume its position under the action of the spring 207 which acts upon it through the screw 201.

All the components have therefore resumed their starting position for a new cycle.

Figure 21:
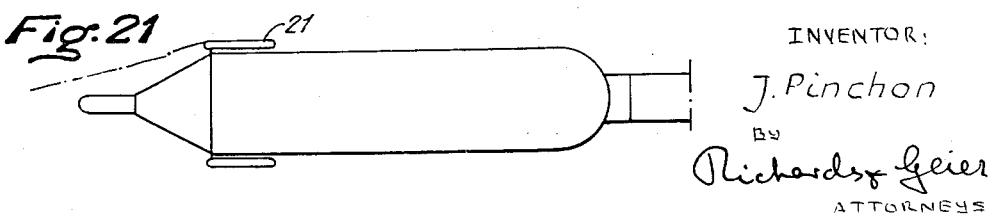
FIG. 21 shows the configuration of the completed cocoon.

(c) During the return of the different elements of the winding stock to their initial position, the spindles on which the cocoons were formed also retreat to their initial position for the formation of the cocoons while completely passing through the rings, e.g. 21 (FIG. 21).

The sequence of operations during doffing will be explained below:

Assuming that a cocoon 30 has just been completed, all the cocoons being produced simultaneously on all the spindles of the machine.

The heel 147 of the winding stock (FIG. 12) has moved sufficiently to the left in order no longer to support the roller 237, so that the lever 232 pivots in the direction of the arrow f3, as explained hereinbefore, and the spindle holder 54 is driven to the left (FIG. 6) while passing the cocoon completely through the ring 21, the yarn 28 being wound in a few turns of large pitch on the outer surface of the cocoon.

In the course of this movement, during which the completed cocoon passes through the ring, the bush holder 54 passes over the contact D (FIG. 8). The contact C had been tensioned at the end of the formation cycle. In consequence, the clutch 286 (FIGS. 4 and 8) is released while the clutch 285 is engaged. The motor me is stopped, so that the spindle extraction bar 66 is locked while the bush holder 54 continues its travel slightly and pushes the cocoon in front of it on the spindle 61. The time-switch Min is tensioned. The bush holder 54 passes over its electric contact D, thus inducing release of the clutch 285, the counterweight returns the spindle extraction bar 66 to a position against the bush holder 54 so that the spindle 61 advances in its bush 51 while driving the cocoon 30 with it, the said cocoon consequently moving away from the bush end formation cone 60. When the time to which the time-switch Min has been set expires, the clutch 286 engages so that the spindle continues to advance with its bush under the action of the winding stock input shaft 119. The yarn begins to wind on the now released formation cone at a finer pitch than the pitch on the outer surface of the cocoon, since the standard reciprocating movement produced by the winding stock has now been resumed and at the moment the pitch changes the knife 29 engages the yarn and cuts it. Winding of the yarn is continued on the formation cone 60.

Actuation of the press-button A (FIG. 8)—alternatively an automatic contact could be provided—results in operation of the motor and reduction gear me, engagement of the clutch 285 and release of the clutch 286. The counterweight rises while the spindle retreats completely (to the right in FIG. 6) so that its free end is retracted inside the bush 62. The cocoons, which are no longer held, then drop on the grids 100 (FIG. 3) inclined towards the cheek 11 which is suitably apertured to enable the cocoons to be collected from these grids. The spindle extraction bar 66 actuates the contact B (FIG. 8), this inducing release of the clutch 285 and tensioning of the time switch Min. The counterweight 284 descends again and brings the spindle heel 64 back against the bush holder 56. When the time to which the time switch has been set expires, the clutch 286 is re-engaged while the clutch 285 remains released. The normal cocoon formation cycle recommences.

During the formation of the cocoons, the bush holders and the spindle extraction bars are driven together positively in their reciprocating movement from the output shaft 119 of the winding stock 121 by means of the belt 111 and the clutch 286 and the transmission 287, 288, 291, 289, 292, 278, 277, 276, 114 respectively. During this time the counterweight 284 ascends and descends permanently under no-load conditions.

The spindle heels 64, on the other hand, are driven alone, by the action of the counterweight 284 in one direction and by the motor and reduction gear me in the other direction (said motor at the same time bringing the counterweight up), by means of the transmission containing the clutch 285.

To sum up, generally, all the movements of the cocoon producing machine 3 are subject to the speed of the card 1. The speed of rotation of the spindles is proportional to that of the card drive motor MC, with the possibility of manual adjustment by means of the wheel 102 of the change-speed device V2. The speed of the elements of the winding stock 121 which controls the reciprocation cycle of the spindles is also proportional to that of the motor MC, and finally the speed of rotation of the rings is also proportional to the speed of the motor MC with automatic variation (under the control of the winding stock 121), in dependence on the instantaneous diameter of the cocoons and with the possibility of manual adjustment by means of the wheel 42 of the change-speed device V1.

In these conditions, the characteristics of the yarn and of the resultant cocoons are determined positively and precisely. The slivers or rovings leaving the rubber undergo determined drawing and twisting without the need for conventional operations such as handling and successive unwinding operations which are so liable to cause yarn breakage. The positive rotation of the spindles and of the rings enables the yarns to be given any desired characteristics. Twisting has a favourable effect on the compactness of the cocoon and enables a higher drawing rate to be used.

The diameter of the cocoons is determined by the fixed cam 218 (FIG. 18) so that by modifying the profile of this cam the maximum diameter of the cocoons can be varied.

The crossing (winding pitch of the yarn on the cocoon) can be adjusted by influencing the speed of the input shaft 155 of the winding stock 121, for example by replacing the gearwheel 255 (FIG. 3) by another of different diameter.

It should be noted that each revolution of the spindles gives one twist turn and that each revolution of the rings with respect to the spindles corresponds to one winding turn and one supplementary twist turn, which disappears on subsequent unwinding of the cocoon, because this is really a false twist which considerably increases the strength of the yarn during production and which does not obstruct the subsequent weaving operations since it disappears then.

The invention is naturally not limited to the embodiment described and illustrated, which has been given by way of example without any limiting force, and numerous modifications familiar to those versed in the art may be made thereto, without thereby departing from the scope of the invention.

I claim:

1. A spinning machine for the production of windings, such as cocoons, cops and pirns, intended to be disposed after a card having a divider and a condenser rubber, said machine comprising a plurality of spinning units, each of which comprises a rotary spindle rotating at a speed proportional to that of the card, and a coaxial ring rotating at a speed gradually differing from the rotational speed of said spindle in response to the actual diameter of the cocoon being formed, said spinning unit being intended to receive a roving leaving the condenser rubber, in order to form a corresponding winding.

2. A spinning machine according to claim 1, wherein each ring comprises a lateral eye serving as a yarn guide, and wherein ring rotating means positively rotates said ring at a speed slight different from that of the spindle, while advance means ensure periodic axial displacement of the spindle with respect to the ring, the amplitude of said displacement being in turn axially offset, on each step, as the winding formation progresses.

3. A spinning machine as defined in claim 1, wherein each ring has a lateral eye serving as a yarn guide, and wherein ring rotating means positively rotates said ring at a speed slightly different from that of the spindle, while advance means ensure periodic axial displacement of the spindle with respect to the ring, the amplitude of the first layers of yarn on the spindle increasing progressively so as to give the conical starting shape, whereupon the amplitude remains constant until completion of the formation of the cocoon, while remaining axially offset on each cycle.

4. A spinning machine according to claim 1, wherein drive means for the rotation of each ring are adapted to rotate said ring at a speed such that the difference between the speed of the ring and that of the spindle be inversely proportional to the diameter of the cocoon at the region where the yarn is being wound at each moment.

5. A spinning machine for the production of cocoons, cops and pirns, intended to be disposed after a card having a divider and a condenser rubber, said machine comprising a plurality of spinning units, each of which comprises a rotary spindle slidably mounted in a bush and rotating at a speed proportional to that of the card, and a coaxial ring, said spinning unit being intended to receive a roving leaving the condenser rubber, in order to form a corresponding cocoon, one end of said bush being conical to serve as a formation cone for the beginning of the cocoon.

6. A spinning machine according to claim 5, wherein each spindle bush carries a gearwheel and the gearwheels of all the bushes are connected together.

7. A spinning machine for the production of cocoons, cops and pirns, intended to be disposed after a card having a divider and a condenser rubber, said machine comprising a pair of parallel guides, a spindle rail the two ends of which slide on said parallel guides, a series of spindle holder bushes mounted in said spindle rail, a rotary spindle mounted in each of said spindle holder bushes and rotating at a speed proportional to that of the card, a spindle extraction bar, the two ends of which are adapted to slide on said parallel guides, each spindle having a heel axially connected to said spindle extraction bar, a ring rail the two ends of which rest on said parallel guides respectively, rings carried by said ring rail coaxially with said spindle respectively and rotating at a speed slightly greater than that of the corresponding spindle, each ring forming together with the corresponding spindle a spinning unit intended to receive a roving leaving the condenser rubber, in order to form a corresponding cocoon, and means for reciprocating said spindle rail on said guides to insure periodical axial displacement of said spindles with respect to said rings, the amplitude of said displacement being in turn axially offset on each step as the cocoon formation progresses.

8. A spinning machine according to claim 7, wherein said spindle extraction bar is driven with a reciprocating movement in the direction of the axes of the spindles, in synchronism with the axial reciprocating movement of said spindle rail under the action of the same driving means.

9. A spinning machine according to claim 7, wherein power means, and an appropriate transmission, enable the spindle extraction bar to be retracted in order to withdraw the spindles into the bushes and free the cocoons, while further power means, enable the spindles to be returned to their initial position with respect to the bushes.

10. A spinning machine for the production of cocoons, cops and pirns, intended to be disposed after a card having a divider and a condenser rubber, said machine comprising a plurality of spinning units, each of which comprises a rotary spindle rotating at a speed proportional to that of the card, a coaxial ring, said spinning unit being intended to receive a roving leaving the condenser rubber, in order to form a corresponding cocoon, and means for driving the spindles with an axial reciprocating movement, said driving means comprising a winding stock which comprises an input shaft, a rocking lever having a variable lever arm actuated by said input shaft, a reciprocating carriage actuated by said rocking lever, a longitudinal worm carried by the said carriage and operating as a rack meshing with an output gearwheel connected to a shaft, said shaft being the backshaft scroll shaft, which controls the reciprocating movement of the spindles, and a pawl system adapted angularly to offset the worm on each movement of the carriage.

11. A spinning machine according to claim 10, wherein said winding stock further comprises cam means, to vary the lever arm of the rocking lever in response to the angular offset movement of the worm.

12. A spinning machine according to claim 11, wherein a device for controlling the end of the cyle, and driven by a rack meshing with a pinion connected to the backshaft scroll shaft, effects disengagement of the rocking lever drive and engagement of a shaft connected to the worm in order to return the latter and the variable lever arm control cam to their initial positions.

13. A spinning machine according to claim 10, further comprising a drive system for rotation of the rings which comprises a variable speed motor controlled by a potentiometer connected to said variable lever arm.

14. A spinning machine according to claim 13, wherein said variable speed motor is fed by the generator of a Ward-Leonard set, the inductors of which are fed from a tachometric generator driven by the card through an amplifier controlled by said potentiometer.

15. A spinning machine for the production of cocoons, cops and pirns, intended to be disposed after a card having a divider and a condenser rubber, said machine comprising a pair of parallel guides, a spindle rail the two ends of which slide on said parallel guides, a series of spindle holder bushes mounted in said spindle rail, a rotary spindle mounted in each of said spindle holder bushes and rotating at a speed proportional to that of the card, a spindle extraction bar, the two ends of which are adapted to slide on said parallel guides, each spindle having a heel axially connected to said spindle extraction bar, a ring rail the two ends of which rest on said parallel guides respectively, rings carried by said ring rail coaxially with said spindles respectively and rotating at a speed slightly greater than that of the corresponding spindle, each ring forming together with the corresponding spindle a spinning unit intended to receive a roving leaving the condenser rubber, in order to form a corresponding cocoon, means for reciprocating said spindle rail on said guides to insure periodical axial displacement of said spindles with respect to said rings, the amplitude of said displacement being in turn axially offset on each step as the cocoon formation progresses, means for axially displacing the spindle holder bushes and the spindles so as to pass each completed cocoon rapidly through the ring to affect doffing of the cocoons, means for temporarily retaining the spindles axially during this movement so as to uncover formation cones so that the yarns begin to wind at the normal pitch, means for withdrawing the spindle bushes and the spindles, the latter by a slightly greater amount than the spindle bushes for retracting the spindles into the bushes in order to drop the cocoons, and means for returning the spindles into the position for the formation of the cocoons which have been begun on the formation cones.

16. A spinning machine according to claim 15, wherein each ring is provided with a yarn cutter formed by a blade extending in a direction parallel to the axis of said ring and tangential to the completed cocoon, so as to cut the yarn at the moment the pitch changes when the yarn passes from the rapid pitch on the surface of the completed cocoon to the fine-pitch formation cone.

17. Installation for the production of cocoons, cops and pirns, from a fibrous textile material adapted to be introduced into a card, said installation comprising a card with a divider and a condenser rubber, and a spinning machine disposed after said rubber and comprising a plurality of spinning units each of which comprises a rotary spindle rotating at a speed proportional to that of the card and a coaxial ring rotating at a speed gradually differing from the rotational speed of said spindle in response to the actual diameter of the cocoon being formed, said spinning unit being intended to receive a roving leaving the condenser rubber, in order to form a corresponding cocoon.

References Cited in the file of this patent
UNITED STATES PATENTS

| | | |
|---|---|---|
| 774,744 | Draper | Nov. 15, 1904 |
| 1,127,994 | Hill et al. | Feb. 9, 1915 |
| 2,142,111 | Camp | Jan. 3, 1939 |
| 2,778,186 | Luttgen et al. | Jan. 22, 1957 |
| 2,995,002 | Leach et al. | Aug. 8, 1961 |